(12) United States Patent
Kaneko

(10) Patent No.: US 8,789,478 B2
(45) Date of Patent: Jul. 29, 2014

(54) DRY DISTILLATION AND GASIFICATION TYPED INCINERATOR

(75) Inventor: Masamoto Kaneko, Takasaki (JP)

(73) Assignee: Kinsei Sangyo Co., Ltd., Gunma (JP)

( * ) Notice: Subject to any disclaimer, the term of this patent is extended or adjusted under 35 U.S.C. 154(b) by 99 days.

(21) Appl. No.: 13/244,180

(22) Filed: Sep. 23, 2011

(65) Prior Publication Data
US 2012/0079970 A1 Apr. 5, 2012

(30) Foreign Application Priority Data
Oct. 4, 2010 (JP) ................................. 2010-224906

(51) Int. Cl.
F23G 5/50 (2006.01)

(52) U.S. Cl.
USPC ........... 110/190; 110/229; 110/235; 110/297; 110/346; 110/348

(58) Field of Classification Search
USPC ......... 110/190, 348, 297, 346, 118, 215, 234, 110/255, 229, 235; 431/6
See application file for complete search history.

(56) References Cited

U.S. PATENT DOCUMENTS

| | | | |
|---|---|---|---|
| 4,113,445 A * | 9/1978 | Gettert et al. | 48/197 R |
| 5,213,051 A * | 5/1993 | Kaneko | 110/229 |
| 5,922,090 A * | 7/1999 | Fujimura et al. | 48/197 R |
| 6,615,748 B2 * | 9/2003 | Sunter et al. | 110/233 |
| 6,746,497 B1 * | 6/2004 | Kaneko | 48/197 FM |
| 2011/0073022 A1 * | 3/2011 | Maryamchik et al. | 110/297 |

FOREIGN PATENT DOCUMENTS

| | | |
|---|---|---|
| JP | 2004-101047 | 4/2004 |
| JP | 2005-016854 A | 1/2005 |
| JP | 2005016854 A * | 1/2005 |
| JP | 4005770 | 8/2007 |
| JP | 2007-285599 A | 11/2007 |
| JP | 2007285599 A * | 11/2007 |
| JP | 2010-096444 | 4/2010 |
| WO | 00/17289 | 3/2000 |

* cited by examiner

Primary Examiner — Kenneth Rinehart
Assistant Examiner — Bao D Nguyen
(74) Attorney, Agent, or Firm — Paul A. Guss

(57) ABSTRACT

Provided is a dry distillation and gasification typed incinerator capable of saving time and fuels required for combustion aid. In a first phase when a waste material A stored in a dry distillation furnace 1 is ignited till a fire bed is formed, the dry distillation and gasification typed incinerator supplies air to the dry distillation furnace 1 through an air supply passage 13. When the waste material A is in a continuous combustion state (a second phase), the oxygen supply to the dry distillation furnace 1 is switched from the air supply by the air supply passage 13 to the concentrated oxygen supply by an oxygen supply passage 15.

10 Claims, 2 Drawing Sheets

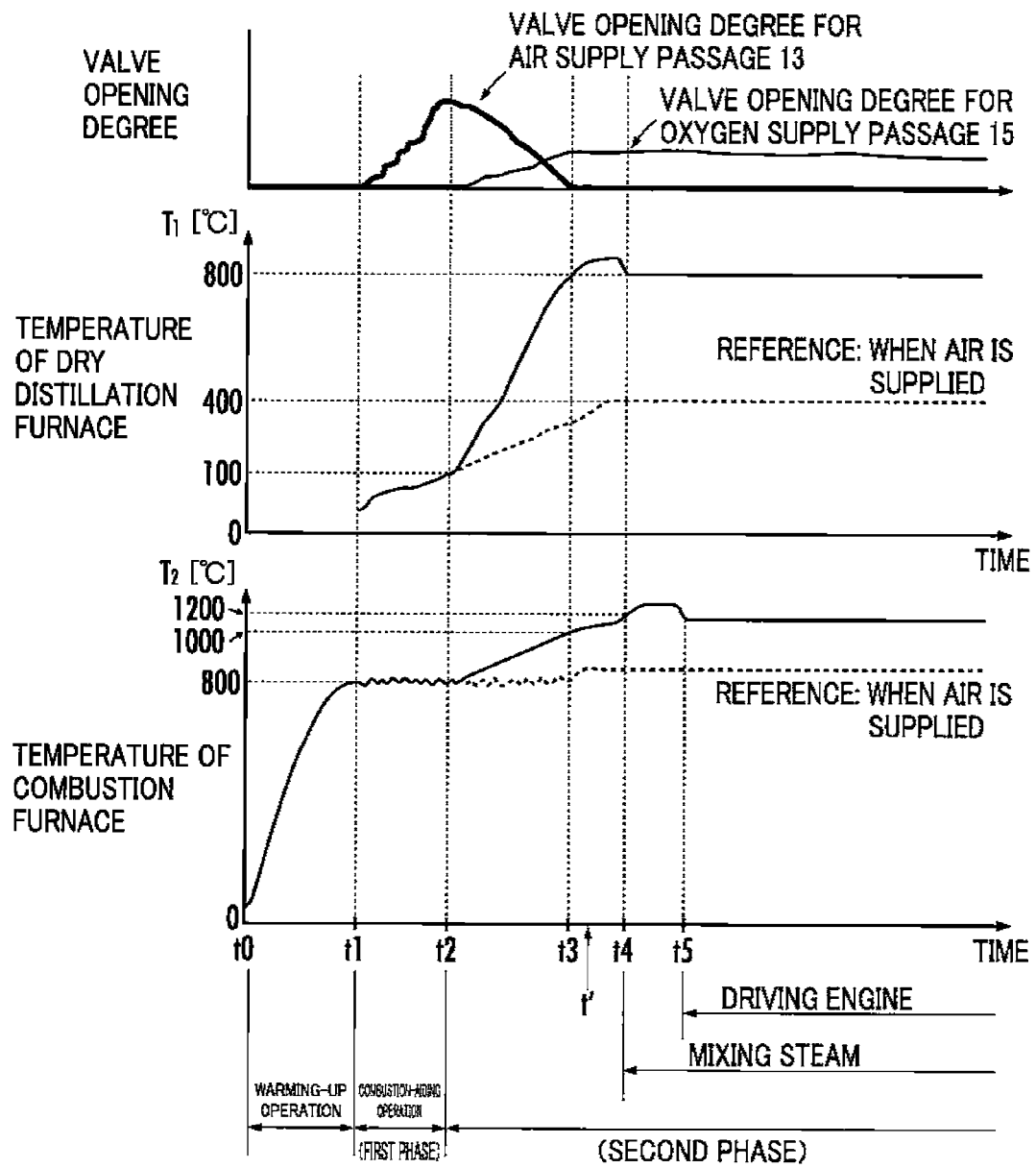

DRY DISTILLATION AND GASIFICATION TYPED INCINERATOR

BACKGROUND OF THE INVENTION

1. Field of the Invention

The present invention relates to a dry distillation and gasification typed incinerator configured to store a waste material and combust a part of the waste material to release a combustion heat to be used to distill the remainder of the waste material through dry distillation to generate a combustible gas.

2. Description of the Related Art

In recent years, there is a trend that more and more waste materials contain a lot of chlorines such as vinyl chloride and the like in their ingredients. When they are incinerated by an incinerator, air pollutants such as nitrogen oxide (NOx), carbon monoxide (CO), dioxins and the like will be generated in the incinerator. Thus, certain environmental standards have been formulated to inhibit emission amounts of these air pollutants.

Particularly, in disposing a waste material by incineration, when the waste material containing chlorines is incinerated at a temperature around 250 to 350° C., the chlorines liberated from the waste material and carbon hydrides generated from the incomplete combustion of resin or the like undergoes a reaction catalyzed by heavy metals contained in the waste material to generate the dioxins.

It has been considered effective to prevent the emission of dioxins from being generated in the incineration disposal of a waste material by detaining the waste material for 2 seconds or more at a temperature of at least 800° C. to completely pyrolyze the generated dioxins.

As an incinerator for incinerating a waste material such as waste tires or the like while preventing the emission of dioxins, the applicants of the present application have disclosed a dry distillation and gasification typed incinerator which is provided with a dry distillation furnace configured to store the waste material and combust a part of the waste material to release a combustion heat to be used to distill the remainder of the waste material through dry distillation to generate a combustible gas, and a combustion furnace configured to completely combust the combustible gas introduced from the dry distillation furnace (for example, refer to JP Patent No. 4005770).

In the apparatus mentioned above, after the combustion furnace is warmed up by the combustion of other fuels to a temperature of at least 800° C. which is possible to pyrolyze the dioxins, the waste material is ignited to generate the combustible gas, the generated combustible gas and the other fuels are combusted together in the combustion furnace. If the combustion of the combustible gas only can maintain the temperature of the combustion furnace stably at a high temperature of more than 800° C., the combustion by the other fuels is terminated. Thereby, in a phase from the initiation of dry distillation of the waste material till the combustible gas in the combustion furnace is stabilized to continue the combustion spontaneously, the temperature of the combustion furnace is maintained at least at 800° C. to prevent the emission of dioxins.

However, in the apparatus mentioned above, the other fuels are required to be combusted before the combustible gas is able to continue the combustion stably and spontaneously. Thereby, there are such problems that it costs time to aid the combustion and the running cost of the apparatus is increased due to the fuels required for combustion aid.

Particularly, since the temperature of the combustible gas introduced into the combustion furnace is lower than the temperature (at least at 800° C.) of the combustion furnace maintained through the warming-up, it decreases the temperature of the combustion furnace, which is the main cause of the time required for combustion aid.

SUMMARY OF THE INVENTION

The present invention has been accomplished in view of the aforementioned problems, and it is therefore an object of the present invention to provide a dry distillation and gasification typed incinerator capable of saving time and fuels required for combustion aid.

A first aspect of the present invention provides a dry distillation and gasification typed incinerator. The dry distillation and gasification typed incinerator of the present invention comprises: a dry distillation furnace configured to store a waste material and to combust a part of the waste material so as to utilize a combustion heat to distill the remainder of the waste material through dry distillation and generate a combustible gas; a combustion furnace configured to combust the combustible gas introduced from the dry distillation furnace; a combustion oxygen supply device configured to supply to the combustion furnace an amount of oxygen required for combusting the combustible gas according to an amount of the combustible gas introduced into the combustion furnace; a combustion furnace temperature detector configured to detect a temperature inside the combustion furnace; and a dry distillation oxygen supply device configured to supply to the dry distillation furnace an amount of oxygen required for combusting the part of the waste material while adjusting the supplied amount oxygen to the dry distillation furnace so as to maintain the temperature inside the combustion furnace detected by the combustion furnace temperature detector at a predefined temperature after the combustion of the combustible gas is initiated in the combustion furnace, wherein the dry distillation oxygen supply device is provided with a first oxygen supply unit configured to supply air to the dry distillation furnace, a second oxygen supply unit configured to supply concentrated oxygen to the dry distillation furnace, and a supply controlling device configured to switch the supply of oxygen to the dry distillation furnace between the first oxygen supply unit and the second oxygen supply unit; and the supply controlling device is configured to supply air to the dry distillation furnace by the first oxygen supply unit in a first phase when the waste material is ignited till the waste material is being combusted continuously, and to switch the oxygen supply to the dry distillation furnace from the first oxygen supply unit to the second oxygen supply unit so as to supply to the dry distillation furnace the concentrated oxygen required to continue the combustion of the waste material by the second oxygen supply unit in a second phase where the waste material is being combusted continuously.

According to the dry distillation and gasification typed incinerator of the first aspect of the present invention, in the first phase when the waste material is ignited till the waste material is being combusted continuously, the air is supplied to the dry distillation furnace by the first oxygen supply unit. Thereby, the dry distillation furnace is filled with air completely, which promotes the formation of a fire bed after the waste material is ignited, enabling the continuous combustion of the waste material to be realized in a short time.

In the second phase where the fire bed is formed and the waste material is being combusted continuously, the oxygen supply to the dry distillation furnace is switched from the first oxygen supply unit to the second oxygen supply unit so as to supply to the dry distillation furnace the concentrated oxygen required to continue the combustion of the waste material. Therefore, the nitrogen component in the air which is irrelative to the combustion of the waste material will not be supplied to the dry distillation furnace, consequently, it is possible to inhibit the ambient temperature in the dry distillation furnace from being decreased by the nitrogen component so as to maintain the temperature in the dry distillation furnace at a high temperature.

By maintaining the temperature in the dry distillation furnace at a high temperature, the temperature of the combustible gas supplied to the combustion furnace would be maintained at a high temperature; thereby, it is possible to prevent the temperature of the combustion furnace from being lowered by the supply of the combustible gas. Further, since the nitrogen component in the air is not supplied to the combustion furnace together with the combustible gas, it is not necessary to increase the temperature of the nitrogen component. Thereby, the temperature of the combustion furnace is inhibited from being lowed after the continuous combustion of the waste material; thus, it is possible to shorten the time required for combustion aid, and meanwhile save the fuels required for combustion aid.

As mentioned in the above, according to the dry distillation and gasification typed incinerator of the first aspect of the present invention, it is possible to save the time and fuels required for combustion aid.

A second aspect of the present invention is dependent on the first aspect of the present invention, wherein the supply controlling device is configured to determine whether or not the waste material is being combusted continuously according to either one or both of the conditions that whether the detection temperature by the temperature detector disposed in the dry distillation furnace is equal to or greater than a first predefined temperature or whether a detection value by an oxygen concentration detector configured to detect a concentration of oxygen contained in the combustible gas generated in the dry distillation furnace is equal to or smaller than a predefined value.

According to the dry distillation and gasification typed incinerator of the second aspect of the present invention, by determining whether or not the waste material is being combusted continuously according to either one or both of the conditions that whether the detection temperature by the temperature detector disposed in the dry distillation furnace is equal to or greater than a first predefined temperature or whether a detection value by an oxygen concentration detector configured to detect a concentration of oxygen contained in the combustible gas generated in the dry distillation furnace is equal to or smaller than a predefined value, it is possible to switch from the first phase to the second phase at an exact timing to enable the combustion of the waste material by the concentrated oxygen only to be executed promptly. Thereby, it is possible to shorten the combustion aid time and save the fuels required for combustion aid.

A third aspect of the present invention is dependent on the first aspect or the second aspect of the present invention, wherein the supply controlling device is configured to switch the first oxygen supply device to the second oxygen supply device by decreasing the amount of air supplied by the first oxygen supply device and increasing the amount of concentrated oxygen supplied by the second oxygen supply device so as to maintain the amount of oxygen required for combusting the combustible gas in the second phase.

According to the dry distillation and gasification typed incinerator of the third aspect of the present invention, the switching from the first phase to the second phase is performed gradually by decreasing the amount of air supplied by the first oxygen supply device and increasing the amount of concentrated oxygen supplied by the second oxygen supply device with the amount of oxygen required for combusting the combustible gas being maintained meanwhile. Accordingly, the switching is prevented from disturbing the combustion of the waste material in the dry distillation furnace, enabling the waste material to be combusted under the concentrated oxygen in the second phase with certainty. Thereby, it is possible to shorten the combustion aid time and save the fuels required for combustion aid.

A fourth aspect of the present invention is dependent on any of the first aspect to the third aspect of the present invention, wherein the dry distillation oxygen supply device is further provided with a steam mixing unit configured to mix steam to the oxygen supplied to the dry distillation furnace, and the supply controlling device is configured to mix the steam to the concentrated oxygen via the steam mixing unit while the concentrated oxygen is being supplied to the dry distillation furnace by the second oxygen supply device if the detection temperature by the temperature detector disposed in the dry distillation furnace is equal to or greater than a second temperature which is a reaction temperature for generating water gas from the steam in the second phase.

According to the dry distillation and gasification typed incinerator of the fourth aspect of the present invention, since the ambient temperature in the dry distillation furnace can be maintained at a high temperature in the second phase, when the ambient temperature becomes equal to or greater than a second temperature which is a reaction temperature for generating water gas which is a gas fuel of a high calorie from the steam, by introducing the steam into the dry distillation furnace, it is possible to generate the water gas. The generated water gas is introduced into the combustion furnace together with the combustible gas and combusted therein, it is possible to increase the calorific power in the combustion furnace so as to save the fuels required for combustion aid.

A fifth aspect of the present invention is dependent on any of the first aspect to the third aspect of the present invention and is further provided with a steam supply device configured to supply steam to the dry distillation furnace if the detection temperature by the temperature detector disposed in the dry distillation furnace is equal to or greater than a second temperature which is a reaction temperature for generating water gas from the steam in the second phase.

According to the dry distillation and gasification typed incinerator of the fifth aspect of the present invention, since the ambient temperature in the dry distillation furnace can be maintained at a high temperature in the second phase, when the ambient temperature becomes equal to or greater than a second temperature which is a reaction temperature for generating water gas from the steam, in place of introducing the steam together with the concentrated oxygen into the dry distillation furnace, it is acceptable to supply the steam only to the dry distillation furnace directly to generate the water gas which is a gas fuel of a high calorie. The water gas is introduced into the combustion furnace together with the combustible gas and combusted therein, it is possible to increase the calorific power in the combustion furnace so as to save the fuels required for combustion aid.

A sixth aspect of the present invention is dependent on any of the first aspect to the fifth aspect of the present invention and is further provided with an internal combustion engine supplied with a part of the combustible gas generated from the dry distillation furnace as a fuel in the second phase.

According to the dry distillation and gasification typed incinerator of the sixth aspect of the present invention, since the nitrogen component in the air is not supplied to the combustion furnace together with the combustible gas in the second phase, it is possible to supply the combustible gas in a high concentration to the combustion furnace. Accordingly, it is possible to shorten the combustion aid time and save the fuels required for combustion aid; and meanwhile, by introducing a part of the combustible gas in a high concentration into the internal combustion engine, it is also possible to drive the internal combustion engine effectively.

BRIEF DESCRIPTION OF THE DRAWINGS

FIG. 2 is a graph illustrating temporal variations of temperatures in a dry distillation furnace and temperatures in a combustion furnace.

DETAILED DESCRIPTION OF THE PREFERRED EMBODIMENTS

Figure 1:
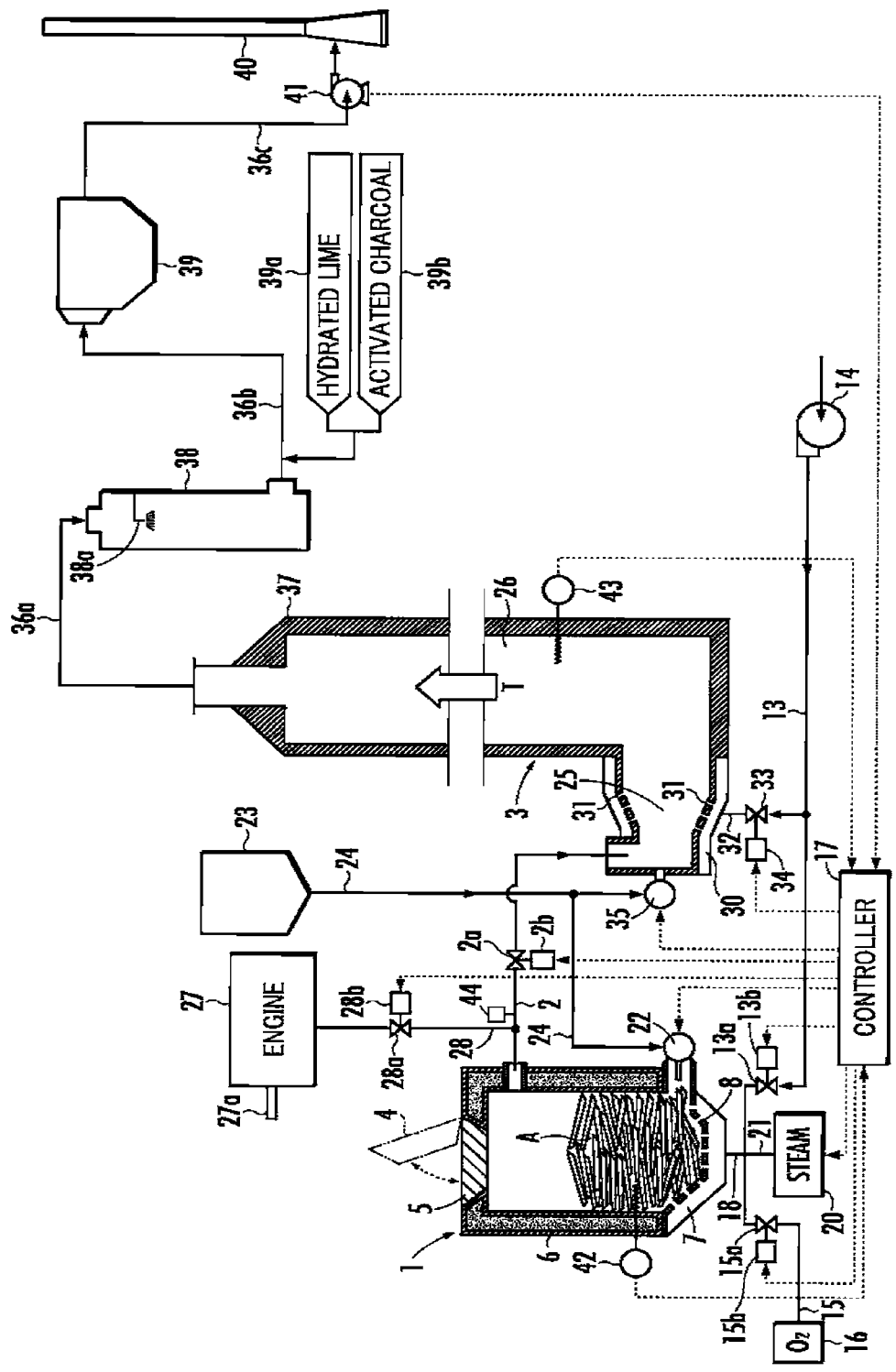
FIG. 1 is a structural diagram illustrating a dry distillation and gasification typed incinerator of one embodiment of the present invention.

As illustrated in FIG. 1, a dry distillation and gasification typed incinerator of the present embodiment for disposing waste materials is composed of a dry distillation furnace 1 for storing a waste material A which is a mixture of various materials mainly including waste paper, waste wood, waste plastics and the like, and a combustion furnace 3 connected with the dry distillation furnace 1 via a gas passage 2. A feed inlet 5 covered by a movable door 4 is formed in an upper surface of the dry distillation furnace 1. The feed inlet 5 enables the waste material A to be fed into the dry distillation furnace 1. When the movable door 4 is closed, the interior of the dry distillation furnace 1 is blocked out from the outside substantially.

The outer periphery of the dry distillation furnace 1 is formed with a water jacket 6 isolated from the interior of the dry distillation furnace 1 as a cooling structure. The water jacket 6 is supplied with water from a water supply device (not shown) to maintain the water amount therein at a predefined water level.

A lower portion of the dry distillation furnace 1 is protruded downward to form into a shape of a truncated cone. A vacant space 7 is formed in the outer periphery of a lower portion of the truncated cone, isolated from the interior of the dry distillation furnace 1. The vacant space 7 is communicated with the interior of the dry distillation furnace 1 through a plurality of air nozzles 8 disposed in the inner wall of the dry distillation furnace 1.

The vacant space 7 at the lower portion of the dry distillation furnace 1 is connected by a dry distillation oxygen supply device. The dry distillation oxygen supply device is composed of a first oxygen supply unit configured to supply air to the vacant space 7, and a second oxygen supply unit configured to supply concentrated oxygen to the vacant space 7.

The first oxygen supply unit is provided with an air supply passage 13 and a blast fan 14 serving as an air supply source for supplying air through the air supply passage 13. The air supply passage 13 is disposed with a control valve 13a, and an opening degree of the control valve 13a is controlled by a valve driver 13b. The valve driver 13b is controlled by a controller 17 composed of an electronic circuit having a CPU and the like.

The second oxygen supply unit is provided with an oxygen supply passage 15 and an oxygen cylinder 16 serving as a concentrated oxygen source for supplying the concentrated oxygen through the oxygen supply passage 15. The oxygen supply passage 15 is disposed with a control valve 15a, and an opening degree of the control valve 15a is controlled by a valve driver 15b. The valve driver 15b is controlled by the controller 17.

The controller 17, the control valves 13a and 15a, and the valve drivers 13b and 15b in the present embodiment are equivalent to a supply controlling device means for switching of the present invention.

The air supply passage 13 and the oxygen supply passage 15 are connected to a communicating pipe 18 which is in communication with the vacant space 7. Moreover, the communicating pipe 18 is connected by a steam supply pipe 21 provided in a steam generator 20 for mixing steam to the oxygen supplied to the vacant space 7 via the communicating pipe 18.

The steam generator 20 is an apparatus, for example, comprising a coiled tubule for generating steam. Water is fed into the coiled tubule from one end thereof, and then the coiled tubule is heated by hot air which is a part of the exhaust gas to vaporize the water in the coiled tubule into steam flowing out from the other end of the coiled tubule.

An igniter 22 is disposed at a lower side portion of the dry distillation furnace 1. The igniter 22 is controlled by the controller 17 to ignite the waste material A stored in the dry distillation furnace 1. The igniter 22 is composed of a pilot burner or the like and is configured to make a fuel such as heavy oil or the like supplied from a fuel supply device 23 via a fuel supply passage 24 to combust so as to provide combustion flames to the waste material A.

The combustion furnace 3 is composed of a burner section 25 and a combustion section 26. The burner section 25 is configured to mix the combustible gas generated from the dry distillation of the waste material A with oxygen (the air) required to completely combust the combustible gas. The combustion section 26 is configured to combust the combustible gas mixed with oxygen. The combustion section 26 communicates with the burner section 25 at a tip end side of the burner section 25. A back end portion of the burner 25 is connected to the gas passage 2. The combustible gas generated from the dry distillation of the waste material A in the dry distillation furnace 1 is introduced into the burner section 25 via the gas passage 2.

The gas passage 2 is provided with a control valve 2a, and an opening degree of the control valve 2a is controlled by a valve driver 2b. The valve driver 2b is controlled by the controller 17.

A communicating pipe 28 is disposed to communicate the gas passage 2 with an engine 27 (equivalent to an internal combustion engine of the present invention) and is configured to branch a part of the combustible gas to the engine 27. The communicating pipe 28 is provided with a control valve 28a, and an opening degree of the control valve 28a is controlled by a valve driver 28b. The valve driver 28b is controlled by the controller 17.

The engine 27 is driven by a mixed fuel of the combustible gas supplied via the communicating pipe 28 and a fuel such as light oil or the like (not shown). An output shaft 27a of the engine 27 may be configured to have a connection with a power generator or the like (not shown).

A vacant space 30 is formed in the outer periphery of the burner section 25, isolated from the interior of the burner section 25. The vacant space 30 is communicated with the interior of the burner section 25 through a plurality of air nozzles 31 penetrated through the inner periphery of the burner section 25. The vacant space 30 is connected by a combustion oxygen supply passage 32 branched from the air supply passage 13. The combustion oxygen supply passage 32 is provided with a control valve 33, and an opening degree of the control valve 33 is controlled by a valve driver 34. The valve driver 34 is controlled by the controller 17.

The back end portion of the burner section 25 is mounted with a combustion device 35. The combustion device 35 is controlled by the controller 17 to combust the fuel such as heavy oil or the like supplied from the fuel supply device 23 via the fuel supply passage 24. The combustion device 35 is composed of a pilot burner or the like and is configured to adjust the supplied amount of the fuel stepwise and combust it. It is also acceptable to use the combustion device 35 to ignite the combustible gas introduced into the burner section 25.

A tip end portion of the combustion section 26 is mounted with a cooling reactor (hot-water boiler) 37 for cooling down the exhaust gas generated from the combustion of the combustible gas in the combustion furnace 3. The cooling reactor 37 is supplied with water from a water supply device (not shown). The cooling reactor 37 utilizes the combustion heat from the waste material to warm up the supplied water into hot water to be used for air-conditioning or the like.

An exit side of the cooling reactor 37 is disposed with a duct 36a for discharging the exhaust gas after being cooled down. The duct 36a is connected to one end of a cooling tower 38.

The cooling tower 38 is provided with a spray 38a for spraying water to the exhaust gas from the cooling reactor 37, and is connected by a water supply device (not shown) supplying cooling water to the spray 38a and an air compressor (not shown).

The other end of the cooling tower 38 is connected to one end of a bag filter 39 via a duct 36b. The exhaust gas expelled from the cooling tower 38 to the bag filter 39 is mixed with hydrated lime 39a and activated charcoal 39b for desulfurization and deodorization.

The bag filter 39 is provided with a filter section (not shown), and a recovery section (not shown) for recovering ashes or the like separated from the exhaust gas by the filter section. The filter section is connected by an air compressor for cleaning the filter section.

The other end of the bag filter 39 is connected to a chimney 40 via a duct 36c. A sucking fan 41 is disposed between the bag filter 39 and the chimney 40 to suck the exhaust gas in the combustion furnace 3 to the chimney 40 via the ducts 36a to 36c so as to discharge the exhaust gas from the chimney 40. The sucking fan 41 is controlled by the controller 17 so that a pressure for sucking the exhaust in the combustion furnace 3 is a desired pressure in accordance with the operation state of the apparatus. An exit of the chimney 40 is attached with sensors (not shown) for detecting concentrations of hydrogen chloride and carbon monoxide, respectively. The concentrations of hydrogen chloride and carbon monoxide in the exhaust gas discharged from the chimney 40 are monitored.

Moreover, in the incinerator of the present embodiment, a temperature sensor 42 is fixed at a lower portion of the dry distillation furnace 1 for detecting a temperature $T_1$ in the dry distillation 1, and a temperature sensor 43 is fixed in the combustion furnace 3 at a position facing the tip end portion of the burner section 25 for detecting a temperature $T_2$ in the combustion furnace 3. Detection signals from the temperature sensors 42 and 43, respectively, are input into the controller 17.

Hereinafter, an incineration method of disposing waste materials by the incinerator of the present embodiment will be described with reference to FIG. 1 and FIG. 2.

When disposing the waste material A through incineration by the apparatus illustrated in FIG. 1, firstly, the movable door 4 of the dry distillation furnace 1 is opened to feed the waste material A into the dry distillation furnace 1 from the feed inlet 5. The waste material A is obtained by mixing various materials mainly from waste paper, waste wood, waste plastics and the like and is adjusted to have such an amount of calorie that when the combustible gas generated from the dry distillation in the dry distillation furnace 1 is continued to be combusted stably, the combustion temperature thereof is at least 800° C. In the present embodiment, the waste material A is adjusted to have such a calorie that the combustion temperature is at least 850° C.

Precisely, the abovementioned combustion temperature is presumed for the case when the waste material A in the dry distillation furnace 1 and the combustible gas in the combustion furnace 3 are combusted by the air supplied from the air supply passage 13, and is different from a presumed combustion temperature when they are combusted by the concentrated oxygen supplied from the oxygen supply passage 15.

After the movable door 4 is closed to seal the dry distillation furnace 1, prior to the ignition of the waste material A, the combustion device 35 of the combustion furnace 3 is actuated by the controller 17 to initiate a warming-up operation by combusting the fuel. Specifically, as illustrated by the graph in FIG. 2 denoting the temporal variation, the combustion of fuel is initiated at the timing $t_0$.

The temperature $T_2$ in the combustion furnace 3 increases as the fuel is being combusted, and when the temperature T detected by the temperature sensor 43 at the timing t1 surpasses 800° C., the igniter 22 is operated by the controller 17 to ignite the waste material A. The combustible gas generated from the combustion of a part of the waste material A is combusted together with the fuel in the combustion furnace 3 to initiate combustion aid operation.

In the combustion aid operation at the time of ignition, as illustrated in FIG. 2, the controller 17 opens the control valve 13a in the air supply passage 13 gradually in accordance with the detection temperature $T_1$ by the temperature sensor 42 in the dry distillation furnace 1. Thus, in the first phase from the ignition of the waste material till the continuous combustion of the waste material A, the supply of concentrated oxygen from the oxygen supply passage 15 is not performed, the fire bed is formed on the waste material A by the air supplied from the air supply passage 13 only.

Thereby, the dry distillation furnace 1 is filled with air completely, which promotes the formation of the fire bed after the waste material A is ignited, enabling the continuous combustion of the waste material A to be realized in a short time.

In the combustion aid operation, when the detection temperature $T_2$ by the temperature sensor 43 in the combustion furnace 3 is equal to or lower than 800° C., the combustion device 35 is operated so as to maintain the temperature $T_2$ in the combustion furnace 3 above 800° C. As illustrated in FIG. 2, according to the operation of the combustion device 35, the temperature $T_2$ in the combustion furnace 3 minutely fluctuate around 800° C., thereby, the fuel is consumed in accordance with the operation of the combustion device 35.

When the detection temperature $T_1$ by the temperature sensor 42 in the dry distillation furnace 1 reaches, for example, 100° C. (equivalent to a first predefined temperature of the present invention), the controller 17 determines that the fire bed has been formed and the waste material A is in the continuous combustion state, and switches the oxygen supply to the dry distillation furnace 1 from the first oxygen supply unit to the second oxygen supply unit.

In other words, in the second phase where the fire bed has been formed and the waste material A is being combusted continuously by the fire bed, the oxygen supply to the dry distillation furnace 1 is switched from the air supply by the air supply passage 13 to the concentrated oxygen supply by the oxygen supply passage 15.

The switching is gradually performed by: (1) maintaining the amount of oxygen required for the continuous combustion of the waste material, (2) increasing the amount of concentrated oxygen supplied by the oxygen supply passage 15 while decreasing the amount of air supplied by the air supply passage 13.

Specifically as illustrated in FIG. 2, the control valve 13a disposed in the air supply passage 13 is narrowed down at the timing $t_2$ to decrease the amount of air supplied to the dry distillation furnace 1, and ⅕ of the decreased amount of air is replaced with the concentrated oxygen by opening the control valve 15a disposed in the oxygen supply passage 15.

The reason for increasing the amount of concentrated oxygen to the dry distillation furnace by ⅕ of the decreased amount of air is based on the fact that oxygen contained in the air is about ⅕ in volume. Accordingly, it is possible to maintain the amount of oxygen required for the continuous combustion of the waste material A.

By switching the air and the concentrated oxygen as mentioned above, it is possible to prevent the switching from disturbing the combustion of the waste material A in the dry distillation furnace 1.

Thus, by supplying the concentrated oxygen required to continue the combustion of the waste material A but not the nitrogen component in the air which is irrelative to the combustion of the waste material A to the dry distillation furnace 1, it is possible to inhibit the ambient temperature in the dry distillation furnace 1 from being decreased by the nitrogen component so as to maintain the temperature $T_1$ in the dry distillation furnace 1 at a high temperature. Specifically, as illustrated in FIG. 2, after the switching to the concentrated oxygen, the detection temperature $T_1$ by the temperature sensor 42 in the dry distillation furnace 1 goes up abruptly.

By maintaining the temperature $T_1$ in the dry distillation furnace 1 at a high temperature, it is possible to make the temperature of the combustible gas supplied to the combustion furnace 3 at a high temperature so as to prevent the temperature $T_2$ of the combustion furnace 3 from being lowered by the supply of the combustible gas. Further, since the nitrogen component in the air is not supplied to the combustion furnace 3 together with the combustible gas, it is not necessary to increase the temperature of the nitrogen component up to the ambient temperature of the combustion furnace 3. Specifically as illustrated in FIG. 2, as the temperature $T_1$ in the dry distillation furnace 1 increases, the detection temperature $T_2$ in the combustion furnace 3 detected by the temperature sensor 43 also increases; after the timing $t_2$ when the switching is performed, the operation of the combustion device 35 is unnecessary.

On the opposite, as illustrated by the dashed lines in FIG. 2, if the switching to the concentrated oxygen is not performed, even after the waste material A is in the continuous combustion state (after the timing $t_2$), it is necessary to operate the combustion device 35 to perform the combustion aid. It is necessary to perform the combustion aid till the timing t' where the temperature $T_2$ in the combustion furnace 3 surpasses 800° C. according to the self combustion of the combustible gas only.

Thus, according to the incinerator of the present embodiment, by performing the switching from the air to the concentrated oxygen, the temperature $T_2$ in the combustion furnace 3 is inhibited from decreasing after the continuous combustion of the waste material A, thereby, it is possible to shorten the time required for the combustion aid from the timing t' to the timing $t_2$ and save the fuels required for the combustion aid in the shortened time interval.

When the detection temperature $T_1$ in the dry distillation furnace 1 detected by the temperature sensor 42 is determined to be equal to or greater than 800° C. (equivalent to the second temperature of the present invention) at the timing $t_3$, the controller 17 operates the steam generator 20 to mix steam into the concentrated oxygen supplied to the dry distillation furnace 1.

Specifically as illustrated in FIG. 2, the concentrated oxygen mixed with steam is supplied to the dry distillation furnace 1 at the timing $t_4$. As a result thereof, the temperature $T_1$ in the dry distillation furnace 1 decreases slightly. This is because the reaction of generating water gas from steam is an endothermic reaction. However, by maintaining the temperature $T_1$ in the dry distillation furnace 1 at least at 800° C. which is the reaction temperature of water gas, it is possible to generate water gas from steam continuously.

Then, the water gas generated in the dry distillation furnace 1 is supplied together with the combustible gas to the combustion furnace 3. Since the water gas is a gas fuel of a high calorie, it is possible to further increase the temperature $T_2$ in the combustion furnace 3. Accordingly, it is possible to increase the calorific power in the combustion furnace 3, avoiding the necessity of the combustion aid when the temperature $T_2$ in the combustion furnace 3 decreases temporarily.

Thereafter, at the timing t5 where the temperature $T_2$ in the combustion furnace 3 becomes stable around 1200° C., the control valve 28a in the communicating pipe 28 in communication with the gas passage 2 is opened and the control valve 2a in the gas passage 2 is narrowed down slightly so as to introduce the water gas and the combustible gas generated in the dry distillation furnace 1 into the engine 27; thereby, it is possible to drive the engine 27 by combusting the introduced gases.

After the water gas is utilized by the engine 27 as a fuel, it is turned into steam; thereby, tar components introduced into the engine 27 together with the gases are exhausted with steam. Accordingly, it is possible to prevent such problems caused by the tar components as engine stall or the like from happening.

As described in detail in the above, according to the dry distillation and gasification typed incinerator of the present embodiment, when the situation (the second phase) where the fired bed is formed and the waste material A is being combusted continuously is reached, the oxygen supply to the dry distillation furnace 1 is switched from the first oxygen supply unit to the second oxygen supply unit so as to supply the concentrated oxygen required to continue the combustion of the waste material A to the dry distillation furnace 1. Therefore, the nitrogen component in the air which is irrelative to the combustion of the waste material A will not be supplied to the dry distillation furnace 1, it is possible to maintain the temperature $T_1$ in the dry distillation furnace 1 at a high temperature. By maintaining the temperature $T_1$ in the dry distillation furnace 1 at a high temperature, it is possible to make the temperature of the combustible gas supplied to the combustion furnace 3 at a high temperature so as to prevent the temperature $T_2$ of the combustion furnace 3 from decreasing, which makes it possible to save the time and the fuels required for combustion aid.

In the present embodiment, the oxygen cylinder 16 is used as a concentrated oxygen source; however, it is not limited thereto, it is acceptable to use any conventional oxygen generator as the concentrated oxygen source.

In the present embodiment, the detection temperature $T_1$ in the dry distillation furnace 1 detected by the temperature sensor 42 is used as a trigger to determine that the fire bed has been formed on the waste material A; however, the present invention is not limited to this feature. For example, in addition to or in place of the mentioned method, it is acceptable to dispose an oxygen concentration detector 44 for detecting the oxygen concentration in the gas passage 2 and to determine the formation of the fire bed (where the combustion having the supplied oxygen consumed only at the fire bed is continuous) if the detection value is equal to or lower than a predefined value (for example, no more than 3%).

Furthermore, in the present embodiment, steam supplied from the steam generator 20 is introduced from the vacant space 7 into the dry distillation furnace 1 together with the concentrated oxygen supplied from the oxygen cylinder 16; however, the introduction method of steam into the dry distillation furnace 1 is not limited thereto.

For example, it is acceptable to partition a part of the vacant space 7 so as to separate the supply passage for the air and the concentrated oxygen from the supply passage for steam. In this case, by connecting the steam supply pipe 21 to the partitioned vacant space, it is possible to introduce steam supplied from the steam generator 20 directly into the dry distillation furnace 1 (without mixing with the concentrated oxygen). Thereby, it is possible to inhibit a part of the steam from liquefying into water when being mixed with the concentrated oxygen, enabling water gas to be generated in the dry distillation furnace 1.

DESCRIPTION OF REFERENCE NUMERALS

1: dry distillation furnace; 3: combustion furnace; 13: air supply passage (first oxygen supply unit); 14: blast fan (first oxygen supply unit); 15: oxygen supply passage (second oxygen supply unit); 16: oxygen cylinder (second oxygen supply unit); 17: controller (supply controlling device); 20: steam generator; 27: engine (internal combustion engine): 42: temperature sensor (dry distillation furnace temperature detector); 43: temperature sensor (combustion furnace temperature detector); A: waste material.

What is claimed is:

1. A dry distillation and gasification typed incinerator comprising:
    a dry distillation furnace configured to store a waste material and to combust a part of the waste material so as to utilize a combustion heat to distill the remainder of the waste material through dry distillation and generate a combustible gas;
    a combustion furnace configured to combust the combustible gas introduced from the dry distillation furnace;
    a combustion oxygen supply device configured to supply to the combustion furnace an amount of oxygen required for combusting the combustible gas according to an amount of the combustible gas introduced into the combustion furnace;
    a combustion furnace temperature detector configured to detect a temperature inside the combustion furnace; and
    a dry distillation oxygen supply device configured to supply to the dry distillation furnace an amount of oxygen required for combusting the part of the waste material while adjusting the supplied amount of oxygen to the dry distillation furnace so as to maintain the temperature inside the combustion furnace detected by the combustion furnace temperature detector at a predefined temperature after the combustion of the combustible gas is initiated in the combustion furnace, wherein:
    the dry distillation oxygen supply device is provided with a first oxygen supply unit configured to supply air to the dry distillation furnace, a second oxygen supply unit configured to supply concentrated oxygen to the dry distillation furnace, and a supply controlling device configured to switch the supply of oxygen to the dry distillation furnace between the first oxygen supply unit and the second oxygen supply unit;
    the supply controlling device is configured to supply air to the dry distillation furnace by the first oxygen supply unit in a first phase when the waste material is ignited till the waste material is being combusted continuously, and to switch the oxygen supply to the dry distillation furnace from the first oxygen supply unit to the second oxygen supply unit so as to supply to the dry distillation furnace the concentrated oxygen required to continue the combustion of the waste material by the second oxygen supply unit in a second phase where the waste material is being combusted continuously;
    the supply controlling device comprises means for switching the first oxygen supply device to the second oxygen supply device by decreasing over a predetermined time period the amount of air supplied by the first oxygen supply device from a first amount to zero while simultaneously increasing over said predetermined time period the amount of concentrated oxygen supplied by the second oxygen supply device from zero to a second amount, said second amount being less than said first amount, while continuously maintaining the amount of oxygen required for combusting the combustible gas in the second phase;
    the dry distillation oxygen supply device is further provided with a steam mixing unit configured to mix steam to the oxygen supplied to the dry distillation furnace; and
    the supply controlling device is configured to mix the steam with the concentrated oxygen through the steam mixing unit while supplying the concentrated oxygen to the dry distillation furnace by the second oxygen supply device if the detection temperature by the temperature detector disposed in the dry distillation furnace is equal to or greater than a second temperature which is a reaction temperature for generating water gas from the steam in the second phase.

2. The dry distillation and gasification typed incinerator according to claim 1, wherein the supply controlling device is configured to determine whether or not the waste material is being combusted continuously according to either one or both of conditions concerning whether the detection temperature by the temperature detector disposed in the dry distillation furnace is equal to or greater than a first predefined temperature, or whether a detection value by an oxygen concentration detector configured to detect a concentration of oxygen contained in the combustible gas generated in the dry distillation furnace is equal to or smaller than a predefined value.

3. The dry distillation and gasification typed incinerator according to claim 1, wherein said second amount is substantially one fifth of said first amount.

4. The dry distillation and gasification typed incinerator according to claim 1 is further provided with an internal combustion engine supplied with a part of the combustible gas generated from the dry distillation furnace as a fuel in the second phase.

5. The dry distillation and gasification typed incinerator according to claim 1, further comprising a combustion assisting device connected to said combustion furnace, which is operated to maintain the temperature inside the combustion furnace above 800° C., wherein operation of said combustion assisting device is stopped upon commencement of switching between the air supplied by said first oxygen supply device and the concentrated oxygen supplied by the second oxygen supply device.

6. A dry distillation and gasification typed incinerator comprising:
a dry distillation furnace configured to store a waste material and to combust a part of the waste material so as to utilize a combustion heat to distill the remainder of the waste material through dry distillation and generate a combustible gas;
a combustion furnace configured to combust the combustible gas introduced from the dry distillation furnace;
a combustion oxygen supply device configured to supply to the combustion furnace an amount of oxygen required for combusting the combustible gas according to an amount of the combustible gas introduced into the combustion furnace;
a combustion furnace temperature detector configured to detect a temperature inside the combustion furnace;
a dry distillation oxygen supply device configured to supply to the dry distillation furnace an amount of oxygen required for combusting the part of the waste material while adjusting the supplied amount of oxygen to the dry distillation furnace so as to maintain the temperature inside the combustion furnace detected by the combustion furnace temperature detector at a predefined temperature after the combustion of the combustible gas is initiated in the combustion furnace; and
a steam supply device configured to supply steam to the dry distillation furnace if the detection temperature by the temperature detector disposed in the dry distillation furnace is equal to or greater than a second temperature which is a reaction temperature for generating water gas from steam in the second phase,
wherein:
the dry distillation oxygen supply device is provided with a first oxygen supply unit configured to supply air to the dry distillation furnace, a second oxygen supply unit configured to supply concentrated oxygen to the dry distillation furnace, and a supply controlling device configured to switch the supply of oxygen to the dry distillation furnace between the first oxygen supply unit and the second oxygen supply unit;
the supply controlling device is configured to supply air to the dry distillation furnace by the first oxygen supply unit in a first phase when the waste material is ignited till the waste material is being combusted continuously, and to switch the oxygen supply to the dry distillation furnace from the first oxygen supply unit to the second oxygen supply unit so as to supply to the dry distillation furnace the concentrated oxygen required to continue the combustion of the waste material by the second oxygen supply unit in a second phase where the waste material is being combusted continuously; and
the supply controlling device comprises means for switching the first oxygen supply device to the second oxygen supply device by decreasing over a predetermined time period the amount of air supplied by the first oxygen supply device from a first amount to zero while simultaneously increasing over said predetermined time period the amount of concentrated oxygen supplied by the second oxygen supply device from zero to a second amount, said second amount being less than said first amount, while continuously maintaining the amount of oxygen required for combusting the combustible gas in the second phase.

7. The dry distillation and gasification typed incinerator according to claim 6, wherein the supply controlling device is configured to determine whether or not the waste material is being combusted continuously according to either one or both of conditions concerning whether the detection temperature by the temperature detector disposed in the dry distillation furnace is equal to or greater than a first predefined temperature, or whether a detection value by an oxygen concentration detector configured to detect a concentration of oxygen contained in the combustible gas generated in the dry distillation furnace is equal to or smaller than a predefined value.

8. The dry distillation and gasification typed incinerator according to claim 6, wherein said second amount is substantially one fifth of said first amount.

9. The dry distillation and gasification typed incinerator according to claim 6 is further provided with an internal combustion engine supplied with a part of the combustible gas generated from the dry distillation furnace as a fuel in the second phase.

10. The dry distillation and gasification typed incinerator according to claim 6, further comprising a combustion assisting device connected to said combustion furnace, which is operated to maintain the temperature inside the combustion furnace above 800° C., wherein operation of said combustion assisting device is stopped upon commencement of switching between the air supplied by said first oxygen supply device and the concentrated oxygen supplied by the second oxygen supply device.

* * * * *